(12) United States Patent
Schoneborn et al.

(10) Patent No.: US 9,289,751 B2
(45) Date of Patent: Mar. 22, 2016

(54) METHOD FOR PRODUCING COMPOSITES OF ALUMINUM OXIDE AND CERIUM/ZIRCONIUM MIXED OXIDES

(75) Inventors: Marcos Schoneborn, Hamburg (DE); Reiner Glockler, St. Michaelisdonn (DE); Anja Paeger, Landrecht (DE)

(73) Assignee: Sasol Germany GmbH, Hamburg (DE)

( * ) Notice: Subject to any disclaimer, the term of this patent is extended or adjusted under 35 U.S.C. 154(b) by 819 days.

(21) Appl. No.: 13/548,693

(22) Filed: Jul. 13, 2012

(65) Prior Publication Data

US 2013/0023410 A1 Jan. 24, 2013

(30) Foreign Application Priority Data

Jul. 14, 2011 (DE) .......................... 10 2011 107 702
Dec. 16, 2011 (EP) ..................................... 11009902

(51) Int. Cl.

| | | |
|---|---|---|
| B01J 23/10 | (2006.01) | |
| B01J 23/00 | (2006.01) | |
| B01J 23/08 | (2006.01) | |
| B01J 21/04 | (2006.01) | |
| B01J 23/63 | (2006.01) | |
| B01J 35/00 | (2006.01) | |
| B01J 35/10 | (2006.01) | |
| B01J 37/03 | (2006.01) | |
| B01J 37/00 | (2006.01) | |
| B01J 37/02 | (2006.01) | |

(52) U.S. Cl.
CPC ............ *B01J 23/10* (2013.01); *B01J 21/04* (2013.01); *B01J 23/63* (2013.01); *B01J 35/002* (2013.01); *B01J 35/1014* (2013.01); *B01J 37/033* (2013.01); *B01J 35/1019* (2013.01); *B01J 37/0045* (2013.01); *B01J 37/0201* (2013.01); *B01J 37/0203* (2013.01); *B01J 2523/00* (2013.01)

(58) Field of Classification Search
None
See application file for complete search history.

(56) References Cited

U.S. PATENT DOCUMENTS

| | | | | |
|---|---|---|---|---|
| 5,531,976 A * | 7/1996 | Decker, Jr. et al. | ...... | B01J 13/00 423/625 |
| 5,883,037 A * | 3/1999 | Chopin et al. | ....... | B01D 53/945 501/105 |
| 6,306,794 B1 | 10/2001 | Suzuki et al. | | |
| 6,831,036 B1 | 12/2004 | Yamazaki et al. | | |
| 7,939,041 B2 | 5/2011 | Darab | | |
| 2009/0023581 A1* | 1/2009 | Di Monte et al. | ............. | 502/263 |
| 2009/0274599 A1 | 11/2009 | Larcher et al. | | |
| 2010/0130349 A1 | 5/2010 | Bae et al. | | |
| 2010/0260652 A1 | 10/2010 | Nakane et al. | | |
| 2013/0108530 A1* | 5/2013 | Chang et al. | ............... | 423/213.5 |

FOREIGN PATENT DOCUMENTS

| | | |
|---|---|---|
| DE | 10332775 | 2/2005 |
| EP | 1172139 | 1/2002 |
| FR | 2897609 | 8/2007 |
| WO | WO 2006/070201 | 7/2006 |
| WO | WO 2006/119549 | 11/2006 |
| WO | WO2007/131902 | 11/2007 |
| WO | WO 2008/113457 | 9/2008 |
| WO | WO 2012/067654 | 5/2012 |

OTHER PUBLICATIONS

Vishista et al(Role of deflocculants on the rheological properties of boehmite sol, Mat Lett 58 (2004) 1576-1581).*
Zahir et al(Preparation and Characterization of Mesoporous ceria-zirconia-alumina nanocomposite with high hydrothermal stability, J Mater Res, vol. 22, No. 11, (2007) pp. 3201-3209).*
Garcia-Garcia et al. "Influence of Cerium Precursor on the Physico-Chemical Features & NO to NO2 Oxidation Activity of Ceria-Zirconia Catalysts," J. Mol. Catal. 2010, 323, 52.
Letichevsky et al., "Obtaining CeO2-ZrO2 Mixed Oxides by Coprecipitation: Role of Preparation Conditions," Appl. Catal. B 2005, 58, 203.
Kaspar et al., "Pd/Ce-:67r0:4O2/Al2O3 as advanced materials for three-way catalysts Part 1. Catalyst characterisation" Appl. Catal. B 2000, 24, 157.
Soria et al., "Influence of thermal sintering on the activity for Co—O2 and Co—O2—No stoichiometric reactions over Pd/(Ce, Zr)Ox/ Al2O3 catalysts." Appl. Catal. B 2002, 38, 15.

* cited by examiner

*Primary Examiner* — Melvin C Mayes
*Assistant Examiner* — Michael Forrest
(74) *Attorney, Agent, or Firm* — Bushman Werner, P.C.

(57) ABSTRACT

The subject matter of the invention is a method for producing composites comprising aluminum oxide and cerium/zirconium mixed oxides, hereinafter referred to briefly as Al/Ce/Zr oxide composite(s) using boehmite and soluble cerium/zirconium salts. Al/Ce/Zr oxide composites produced in this way have an increased thermal stability.

24 Claims, 2 Drawing Sheets

Figure 1:
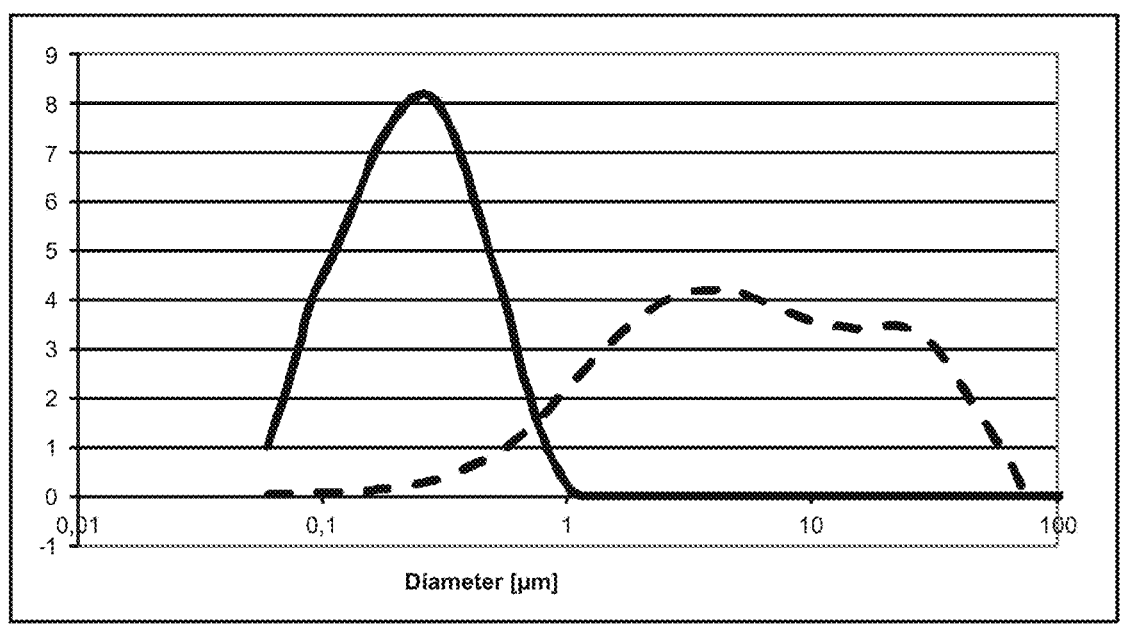

METHOD FOR PRODUCING COMPOSITES OF ALUMINUM OXIDE AND CERIUM/ZIRCONIUM MIXED OXIDES

The present invention relates to a method for producing composites comprising aluminum oxide and cerium/zirconium mixed oxides, hereinafter referred to in abbreviated form as Al/Ce/Zr oxide composite(s). Al/Ce/Zr oxide composites produced in this way have an increased thermal stability.

Al/Ce/Zr oxide composites with incorporated catalytically active noble metals are known and are used for catalytic exhaust gas aftertreatment, for example, of combustion gases in particular, which have been discharged from the combustion chamber(s) of motor vehicles. Such automotive catalysts usually consist of multiple components. A thermally stable honeycomb body made of ceramic, usually cordierite, or metal films having a plurality of thin-walled channels is used as the carrier. The so-called wash coat, comprising porous aluminum oxide ($Al_2O_3$) and oxygen storage components, is applied to the carrier. The wash coat also contains catalytically active noble metals incorporated into it. In modern exhaust gas catalysts, these are platinum, rhodium and/or palladium. The ceramic carrier is supported in a metallic housing with the help of special bearing mats made of high-temperature wool, for example, less often in combination with wire mesh. Wash coats containing Al/Ce/Zr oxide composites are known for aftertreatment of exhaust gas of combustion engines in which the cerium/zirconium mixed oxides act as oxygen storage components. The Al/Ce/Zr oxide composites according to this invention are used in the above automotive catalysts.

WO 2006/070201 A2 describes an improved variant for producing mixed oxides of aluminum oxide, zirconium oxide and optionally at least one representative from $CeO_2$, $La_2O_3$, $Nd_2O_3$, $Pr_6O_{11}$, $Sm_2O_3$, $Y_2O_3$ and possibly other rare earth oxides. Production is based on joint precipitation of the corresponding salts. The mixed oxides are produced by joint precipitation of all the oxides involved, starting from a metal salt solution, where the pH is adjusted in the range of 8.5±1 during precipitation. Precipitation is performed by adding alkali hydroxides, in particular sodium hydroxide solution.

WO 2008/113457 A1 describes the production of Al/Ce/Zr oxide composites based on mixtures of aluminum oxide and cerium/zirconium mixed oxides that are produced separately.

U.S. Pat. No. 5,883,037 describes the importance of the thermal stability of the composite materials. The process described here is a multistep process, in which Ce, Zr and optionally Pr salts are first precipitated by raising the pH and then the precipitate is isolated. The precipitate is brought into contact with alumina while mixing, then isolated and subjected to drying and calcination. The alumina is preferably stabilized by foreign ions from the group of rare earths, Ba, Zr or Si. The Ce/Zr mixed oxides and Ce/Zr/Pr mixed oxides produced by precipitation may optionally also be stabilized, e.g., by at least one element of group VIII, bismuth or some other rare earth element. One disadvantage of this production process is due to the low homogeneity of the resulting material.

EP 1172139 A1 describes the production of homogeneous $Al_2O_3/CeO_2/ZrO_2/Y_2O_3/La_2O_3$ mixed oxides by coprecipitation as well as their thermal stabilities. In the process described there, the Al—Ce—Zr—Y—La hydroxide intermediates resulting from joint precipitation were calcined and thus converted to the oxides.

WO 2006/119549 A1 describes a process in which a solution of metal salts is added to an acidic boehmite suspension to obtain a second suspension. Precipitation is induced by dropwise addition of the second suspension to an alkaline solution. The method of WO 2006/119549 A1, as also shown by Examples 1 and 2, leads to the development of discrete islands of Ce/Zr/rare earth mixed oxide in addition to aluminum oxide. A very similar process is described in Comparative Examples 3, 14 and 15 of U.S. Pat. No. 6,831,036. The residual surface areas described there are max. 39 $m^2/g$ after calcination at 1000° C. for three hours due to the process.

WO 2012/67654 A1 describes a process in which Al/Ce/Zr/rare earth oxide composite is produced by a two-step precipitation. In the first step here an "aluminum hydrate" and optionally a rare earth hydroxide are produced by precipitation of aluminum sulfate with sodium aluminate. After renewed acidification of the suspension, then the Ce/Zr/rare earth component is precipitated by adding the corresponding salt solution to this suspension and then increasing the pH again. The Al/Ce/Zr/rare earth oxide composite thereby obtained should have a surface area (in $m^2/g$) that can be obtained from the formula SA=0.8235·[Al]+11.157 after calcining at 1100° C. for five hours. The residual surface area of the materials after calcining at 1200° C. for five hours is obtained by the formula SA=0.3·[Al]+7. WO 2012/67654 A1 was published subsequently. The respective priority application relates to a different subject matter than that indicated above.

The object of the present invention is to provide improved Al/Ce/Zr (optional rare earth) oxide composites having a definitely higher thermal surface stability, in particular at temperatures of 1100° C. or more (e.g., for 24 hours or more). Surface stability in this sense refers to (largely) preserving the surface at high temperatures as measured according to BET. At the same time a maximum degree of homogeneity is to be achieved. Homogeneity here is understood to be a uniform distribution of the phase of $Al_2O_3$ and Ce/Zr/rare earth mixed oxide without the formation of discrete islands.

This object is achieved by a method according to claim 1. Preferred embodiments are the subject matter of the dependent claims and/or are described below.

It has been found that the Al/Ce/Zr oxide composites obtained by the method according to the invention and optionally containing additional rare earth oxide components at least contain the Ce/Zr oxide in the form of a solid solution. This can be proven by x-ray powder diffraction analysis. In addition $Al_2O_3$ and the Ce/Zr (optional rare earth) mixed oxides are present in a completely homogeneous distribution side by side, as has been demonstrated by EDX (energy-dispersive X-ray analysis) and element mapping. No domains for individual metal oxides were detected. The indication // reporting of the components $Al_2O_3$ and Ce/Zr mixed oxides and/or Ce/Zr (optional rare earth) mixed oxides and/or Al/Ce/Zr (optional rare earth) oxide composites does not preclude other metal oxide being components of the mixed oxides or of the composite. The composites preferably consist only of $Al_2O_3$ and Ce/Zr (optional rare earth) mixed oxides.

The process described in this invention differs from the prior art described above in that an aqueous alkaline boehmite suspension (slurry) is used and the precipitation is performed in the suspension in the presence of soluble metal salts, forming a Ce/Zr (optional rare earth) hydroxide precipitate wherein the Ce/Zr (optional rare earth) hydroxide precipitate (unlike the later solid solution) is homogeneously distributed in the boehmite matrix. The degree of homogeneity and the effective separation of the Ce/Zr (optional rare earth) mixed oxide crystallite by the aluminum oxide which is associated with this is achieved by a very homogeneous precipitation in which the boehmite particles do not sediment within the suspension even in an alkaline medium. The consistently high pH ensures a uniform precipitation of the Ce/Zr (optional rare earth) hydroxides so that these are present in the form of a homogeneous solid solution after calcination.

In the process described here the use of alkali and in particular sodium hydroxide solution may be omitted. Removal of alkali and/or sodium hydroxide from the composite material is absolutely essentially for the application and thus the omission of these components constitutes an important advantage.

The inventive method comprises the following steps:
(a) Providing a suspension comprising boehmite as the alumina precursor and adjusting the pH to 6-11.5, preferably 8 to 10.5 or 9 to 10.5, e.g., with an aqueous solution of ammonia. A preferred embodiment involves an aqueous suspension of boehmites which are modified with organic compounds comprising at least one carboxyl group and one or more additionally groups selected from hydroxy (—OH), oxo (—O), carboxy (—COO) and/or amine (—NH) groups, e.g., tartaric acid or citric acid, preferably in amounts by weight of 0.1% to 50% by weight, in particular 3% to 12% by weight, based on the dry weight of the boehmite
(b) Preparing an aqueous metal salt solution containing metal salts of cerium and of zirconium and optionally one or more rare earth elements. All water-soluble salts (e.g., acetates, nitrates, chlorides) are suitable for this production. Soluble in this sense means that a stable solution of at least 5 g salt (based on the oxidic form of the metal) in 100 g water is established while stirring at the reaction temperature. In a preferred embodiment, metal nitrates are used Ammonium cerium(IV) nitrate, in particular is used as the cerium source. According to another preferred embodiment, cerium(III) nitrate may be used if the resulting metal salt solution is oxidized, e.g., with an aqueous $H_2O_2$ solution.
(c) Bringing the suspension of (a) in contact with the metal salt solution from (b) preferably at a pH of 6.5 to 11, in particular 8 to 10.5, especially preferably 8.5 to 10 and independently thereof, in particular at temperatures of 5 to 95° C. preferably 80 to 95° C. or exposing the resulting slurry to these temperatures, in particular
  (c1) Starting with the metal salt solution and adding by drops the alumina precursor suspension and then adjusting the pH to 6.5 to 11, in particular 8 to 10.5, especially preferably 8.5 to 10.
  (c2) Starting with the metal salt solution and adding by drops to the alumina precursor suspension while at the same time adjusting the pH to 6.5 to 11, in particular 8 to 10.5, especially preferably 8.5 to 10.
  (c3) Starting with the alumina precursor and simultaneous dropwise addition of the metal salt solution and the ammonia solution to obtain a pH of 6.5 to 11, in particular 8 to 10.5, especially preferably 8.5 to 10.
(d) Separating the aqueous solution and washing the solids from (c) with water.
  (d1) Optionally the suspension from (c) is hydrothermally aged (autoclaved), then filtered and the solids washed with deionized water.
  (d2) Drying the solids from (d), e.g., by
    (d2.1) Drying the solids, e.g., at 120° C. for sixteen hours under the influence of heat.
    (d2.2) Redispersing the solids from (d or d1) and then spray drying. In a special embodiment, one or more additional soluble compounds are added before spray drying and in particular only after step (c) or after redispersing. The preferred salts are acetates, e.g., La acetate and/or salts of the alkaline earth elements, rare earth elements, zirconium or silicon.
(e) Calcining the solids from (d or d1 or d2), e.g., in the temperature range of 550-1200° C. preferably in the range of 600-1000° C., in particular for at least one hour.

To adjust the pH, nitrogen bases may be used, including urea or urotropin, for example, in addition to ammonia. The suspension comprising boehmite, in particular is thus adjusted to the required pH.

The composite may also comprise one or more alkaline earth elements/compounds, rare earth elements/compounds, zirconium and/or silicon, in particular rare earth elements/compounds, wherein these are preferably added before drying, in particular only after step (c) or even (d) in the form of one or more additional soluble compounds.

According to one embodiment the suspension of (c) is aged hydrothermally in an aqueous environment, preferably at a temperature of at least 90° C. for at least one hour, in particular for at least four hours at a temperature of at least 120° C.

In particular water-soluble salts of the metals are used to produce the metal salt solution, e.g., acetates, nitrates and/or chlorides. In the inventive methods, the addition of alkali salts and/or alkaline earth salts is preferably omitted, excluding barium salts which may optionally be used.

The Ce/Zr (optional rare earth) oxide is in the form of a solid solution in the composite, and $Al_2O_3$ and the Ce/Zr (optional rare earth) mixed oxide/solid solution are present in homogeneous distribution side by side.

The Al/Ce/Zr oxide composite preferably contains 20% to 80% by weight preferably 40% to 70% by weight aluminum, 5% to 80% by weight preferably 5% to 40% by weight zirconium, 5% to 80% by weight preferably 5% to 40% by weight cerium, 0% to 12% by weight preferably 0.1% to 9% by weight rare earth metal(s) (RE), calculated as $Al_2O_3$, $ZrO_2$, $CeO_2$, $RE_2O_3$. The amount of the other soluble compounds added in step (d2.2) after redispersing is preferably 0.1% to 15% by weight (calculated as oxide) based on the weight of $Al_2O_3$. Preferred rare earth metals include neodymium, praseodymium, yttrium and/or lanthanum.

The Al/Ce/Zr oxide composites preferably still have a surface area of at least 20 $m^2/g$ preferably at least 40 $m^2/g$ after four hours at 1200° C.

The aluminum/cerium/zirconium mixed oxides can be used in automotive catalysts such as three-way catalysts (WC) or also in other components such as $NO_x$ storage mechanisms, diesel oxidation catalysts (DOC) and diesel carbon black particle filters (DPF). Their structure was described in the introduction.

Boehmites in the sense of this invention are compounds of the general formula $AlO(OH) \times H_2O$. Boehmites produced by hydrolysis of an aluminum alkoxide are preferred; see U.S. Pat. No. 5,055,019 ("Process for the Production of Boehmitic Aluminas"). By this process, boehmitic aluminas are obtained in a purity of at least 99.95% $Al_2O_3$ with defined pore radii in a range between 3 and 100 nm by salt-free aqueous neutral aluminum alcoholate hydrolysis, wherein the alumina suspension obtained from aluminum alcoholate hydrolysis is aged in an autoclave a) at a water vapor pressure of 1 to 30 bar corresponding to a temperature of 100 to 235° C., b) in a period of 0.5 to 20 hours and c) while stirring at a circumferential velocity of 1.0 to 6.0 m/s.

According to the invention aluminum alcoholates are used in the production of the boehmitic aluminas to obtain high purity products. The aluminum alcoholates may be synthesized by the Ziegler process, for example, in which a purification step is performed by filtration. To produce the aluminum alcoholates, for example, $C_1$ to $C_{24}$ alcohols or mixtures thereof may be used, for example.

The boehmites that are used are characterized by their especially high purity among other things (concentrations of $SiO_2 \leq$ approx. 0.01%, $Fe_2O_3 \leq$ approx. 0.01%, $Na_2O \leq$ approx. 0.002%, $K_2O \leq$ approx. 0.002%, $TiO_2 \leq 0.005\%$, other elements $\leq 0.01\%$). Regardless of this in another preferred form, boehmites having a pore volume of 0.4 to 1.2 mL/g and/or crystallite sizes of 4 to 40 nm preferably 4 to 16 nm measured on the (120) reflex are used.

According to an especially preferred embodiment, the boehmites are modified with organic compounds having at least one carboxy group and one or more additional groups selected from hydroxy (—OH), carboxy (—COO) and/or amine (—NH, including —$NH_2$) groups, e.g., tartaric acid or citric acid, in particular with 2 to 12 carbon atoms, especially preferably 4 to 8 carbon atoms, preferably in amounts by weight of 0.1% to 50% by weight, in particular 5% to 15% by weight, based on the dry weight of boehmite. These present agglomeration and sedimentation of the boehmites in the alkaline medium. Other suitable substituted carboxylic acids in the sense of the invention include 2-hydroxypropionic acid, 2-oxopropionic acid, hydroxybutanedicarboxylic acid, dihydroxybutanedicarboxylic acid, 2-hydroxypropane-1,2,3-tricarboxylic acid (citric acid), L-aspartic acid, L-serine, glycine, L-leucine, L-tyrosine or L-tryptophan, for example.

The composites produced according to the invention comprise aluminum oxide and cerium/zirconium (optional rare earth) mixed oxides and have as catalyst also platinum rhodium and/or palladium according to one embodiment.

Based on the present invention, it has also been found that precipitation in the presence of an alkaline suspension of a boehmite modified by addition of the above multifunctional organic acids, in particular in combination with the use of ammonium cerium(IV) nitrate as the cerium source leads to end products with an especially great thermal stability. Surprisingly and independently thereof, this effect is especially pronounced when the alkaline suspension is added by drops to the metal salt solution.

Figure 2:
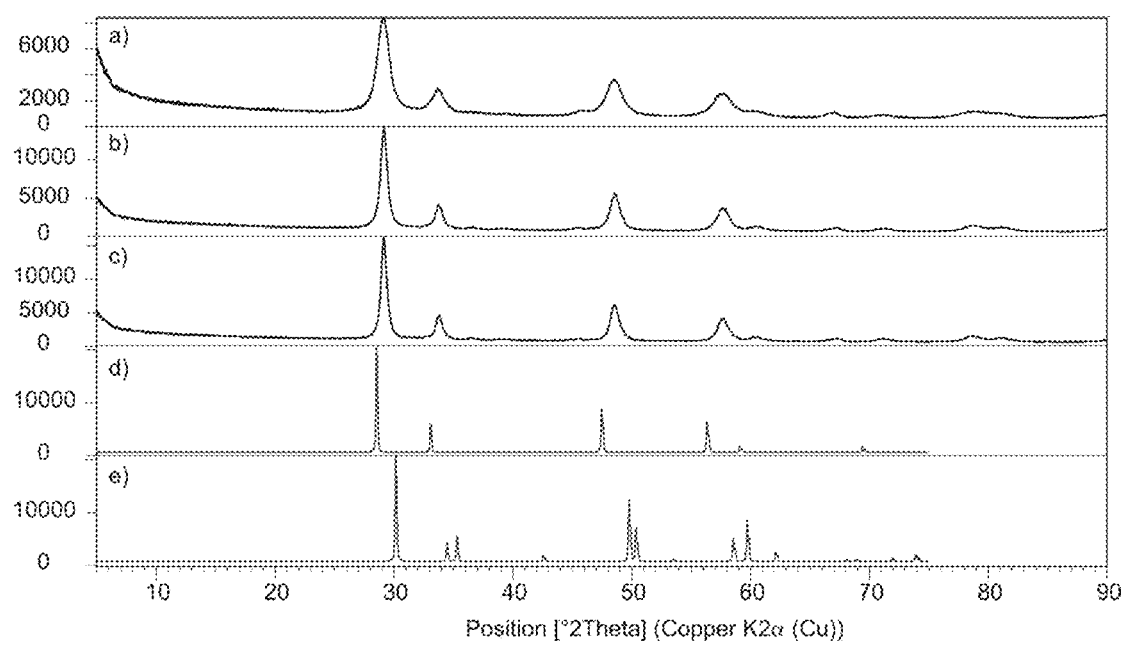

The invention will now be explained in greater detail based on the illustrations, in which FIG. 1 shows the particle size distributions of Examples A1 and A2 in aqueous suspensions;

FIG. 2 shows x-ray powder diffractograms of the material from Example 2 after calcination.

The following experimental examples show that
a) higher residual surface areas are obtained in comparison with the synthesis procedures in EP 1172139 B1 and WO 2012/067654 A1,
b) high residual surface areas are obtained even after calcination under especially sharp conditions (1150° C./36 h, 1200° C./4 h),
c) in Comparative Example 3, surface areas which are also very high and are within the range of the inventive composites produced by the process described here (Comparative Example 3 and Example 6) are obtained, however, the process described here does not require the use of sodium, which is a significant advantage in the process technology because sodium leads to poisoning of noble metal catalysts
d) in Comparative Example 5 high residual surface areas were also obtained which are also within the range of the composites produced by means of the process described here (Comparative Example 5, Examples 7 and 8).

However, in one embodiment, the process described here proposes the use of modified boehmite, which facilitates dispersibility in an alkaline medium. Thus there is no agglomeration or sedimentation of the boehmite, but instead there is an especially homogeneous precipitation and distribution of the $CeO_2/ZrO_2$/(optional rare earth oxide) components at an elevated pH in the presence of finally dispersed boehmite, which is apparent on the basis of the particle sizes in the aqueous suspension at a high pH. This is demonstrated in Examples A1 and A2.

The measurements of the surface areas (BET) were performed using a Micromeritics TriStar 3000 according to DIN ISO 9277. The x-ray diffractograms were measured using a Panalytical X'Pert Pro MDB diffractometer. The percentage amounts are percent by weight, unless otherwise indicated. The particle distributions were determined using a Malvern Mastersizer 2000 with the Hydro-S dispersion unit in water. The measurement was performed according to ISO 13320: 2009 using the Fraunhofer method for the analysis.

Comparative Example 1

Synthesis According to Example 27 of EP 1172139 B1

Composition: 61.5% $Al_2O_3$, 21% $CeO_2$, 15% $ZrO_2$, 2.5% $Y_2O_3$

A mixture consisting of 96.43 g of an aqueous solution of zirconyl nitrate ($ZrO_2$ content=7%), 52.5 g of an aqueous solution of cerium(III) nitrate ($CeO_2$ content=18%), 6.32 g of an aqueous solution of yttrium nitrate ($Y_2O_3$ content=17.80%) and 205.61 g aluminum nitrate nonahydrate in crystalline form was mixed with 600 mL water and stirred until obtaining a clear solution.

This solution was mixed with 7.47 g of a 35% $H_2O_2$ solution (corresponding to 1.2 times the molar quantity of cerium) and this mixture was stirred for approx. 25 minutes. The resulting solution was then brought to a pH of 7 by adding a 24% ammonia solution and stirred for 15 minutes. The resulting mixture was filtered and the filter residue was washed with deionized water at 60° C. This filter cake was then dried at 120° C. for sixteen hours. Following that, the dry filter cake was calcined first at 300° C. for five hours and then at 700° C. for five hours.

The measured surface area is shown in Table 1.
BET after 300° C./5 hours+700° C./five hours (starting material): 168 m²/g
BET after 950° C./5 hours: 109 m²/g
BET after 1000° C./4 hours: 84 m²/g
BET after 1100° C./2 hours: 32 m²/g Comparative Example 2

Synthesis According to Example 1 of EP 1172139 B1

Composition: 41% $Al_2O_3$, 30% $CeO_2$, 23% $ZrO_2$, 2.5% $Y_2O_3$, 3.5% $La_2O_3$ A mixture consisting 145.93 g of an aqueous solution of zirconyl nitrate ($ZrO_2$ content=7%), 72.25 g of an aqueous solution of cerium(III) nitrate ($CeO_2$ content=18%), 6.07 g of an aqueous solution of yttrium nitrate ($Y_2O_3$ content=17.80%), 10.81 g of an aqueous solution of lanthanum nitrate ($La_2O_3$ content=14.57%) and 138.08 g aluminum nitrate nonahydrate in crystalline form was mixed with 600 mL water and stirred until a clear solution was obtained.

This solution was mixed with 10.71 g of a 35% $H_2O_2$ solution (corresponding to 1.2 times the molar quantity of cerium) and this mixture was stirred for approx. 25 minutes. The resulting solution was then brought to a pH of 7 by adding a 24% ammonia solution and stirred for 15 minutes. The resulting mixture was filtered and the filter residue was washed with deionized water at 60° C.

This filter cake was then dried at 120° C. for sixteen hours. Following that, the dry filter cake was calcined first at 300° C. for five hours and then at 700° C. for five hours.

The measured surface area is shown in Table 2.

Comparative Example 3

Synthesis According to Example 6 of WO 2006/070201 A2

Composition: 51% $Al_2O_3$, 14.2% $CeO_2$, 34.8% $ZrO_2$

An aluminum nitrate solution was prepared by stirring 112.5 g aluminum nitrate monohydrate into 1500 mL water. To this solution were added 14.77 g of a cerium(III) nitrate solution ($CeO_2$ content=28.85%) and 149.16 µl of a zirconyl nitrate solution ($ZrO_2$ content=7%). This mixture was then stirred at room temperature for 15 minutes. A pH of 10 was adjusted by adding 25% sodium hydroxide solution and this value was maintained during the precipitation process. Then 5 g of 35% $H_2O_2$ solution was added and the pH was again adjusted to 10. The resulting suspension was then stirred for 60 minutes. Following that the pH was set at 8 by adding 30% nitric acid and the suspension was again stirred for 30 minutes.

The resulting mixture was filtered and the filter residue was washed with deionized water at 60° C. This filter cake was then suspended in 850 mL deionized water and the pH was adjusted to 10 by adding 25% sodium hydroxide solution. The mixture was then autoclaved for six hours at 120° C. The aged suspension was cooled to room temperature, adjusted to a pH of 8 by adding nitric acid and then stirred for 30 minutes.

Following that the suspension was again stirred for one hour at 60° C. and then the liquid was filtered. The resulting filter cake was then washed with deionized water at 60° C. and following that calcined for 4 hour at 850° C. The measured surface area is given in Table 3.

Comparative Example 4

Synthesis According to Example 12 of WO 2012/067654 A1

Composition: 50% $Al_2O_3$, 30% $CeO_2$, 15% $ZrO_2$, 3.5% $La_2O_3$, 1.5% $Y_2O_3$ Solution A was prepared by adding 6.0 g of a solution of lanthanum nitrate ($La_2O_3$ content 14.57%) to 53 g of a 24% ammonia solution and 110 g distilled water.

Solution B was prepared by combining 22.19 g zirconyl nitrate ($ZrO_2$ content=33.80%), 35.89 g cerium(III) nitrate ($CeO_2$ content=41.80%), 4.21 g of a solution of yttrium nitrate ($Y_2O_3$ content=4.21%), 100 g distilled water and hydrogen peroxide with a molar ratio of $H_2O_2/CeO_2$ of 3.

Solution C was prepared by the dissolving 46.3 g sodium aluminate in 200 g distilled water.

Starting with 2 liters of distilled water, it was heated to 65° C. Solution A was added by drops within 25 minutes and the pH was kept at 7.3 at the same time by adding solution C. After adding all of solution A, the remainder of solution C was added completely, thereby adjusting the pH to 9.8. Next the resulting suspension was adjusted to a pH of 4 using dilute nitric acid. Following that solution B was added within 20 minutes. Meanwhile the pH was kept at 4 by adding 10% ammonia solution. After completely adding solution B the pH was raised to 8.2 by adding concentrated ammonia solution. The suspension was filtered and the solids were washed with 2 liters of an aqueous solution of ammonium bicarbonate (120 g/liter $H_2O$) heated to 60° C. Table 4 lists the resulting surface areas.

Comparative Example 5

Synthesis According to Comparative Example 3 of U.S. Pat. No. 6,831,036 and/or Example 7 of WO 2006/119549 A1

Composition: 50% $Al_2O_3$, 30% $CeO_2$, 15% $ZrO_2$, 3.5% $La_2O_3$, 1.5% $Y_2O_3$ 15 g $CeO_2$, 7.5 g $ZrO_2$, 1.75 g $La_2O_3$ and 0.75 g and 0.75 g $Y_2O_3$ in the form of their nitrates were dissolved in water, then 31.53 g DISPERAL HP 14 (boehmite $Al_2O_3$ content=79.3%) was added to this acidic solution and the resulting suspension was stirred for 30 minutes. Concentrated ammonia solution (300 g) was diluted with 750 mL water and used as the starting material at room temperature. The acidic boehmite/metal nitrate solution was added by drops slowly to the ammonia solution and stirring was continued for 30 minutes after the addition was concluded. The solids were separated by filtration, washed with 1.5 liters water and then dried for sixteen hours at 100° C.

Table 4 shows the resulting surface areas.

Example A1

Preparing an Alkaline Boehmite Suspension by Using a Pure Boehmite

A suspension with an $Al_2O_3$ content of 5% was prepared by stirring DISPERAL HP 14 (boehmite) into deionized water at pH 7. Next the pH was set at 10 by adding a 24% ammonia solution. The particle sizes in the suspension were determined by laser diffraction (Mastersizer):

$D_{10}$=0.96 µm; $D_{50}$=5.11 µm; $D_{90}$=28.34 µm

The measured particle size distributions are shown in FIG. 1.

Example A2

Preparing an Alkaline Boehmite Suspension by Using a Modified Boehmite

A suspension with an $Al_2O_3$ content of 5% was prepared by stirring DISPERAL HP 14/7 (boehmite modified with citric acid) into deionized water at pH 7. Next the pH was set at 10 by adding a 24% ammonia solution. The particle sizes in the suspension were determined by laser diffraction (Mastersizer):

$D_{10}$=0.09 µm; $D_{50}$=0.23 µm; $D_{90}$=0.67 µm

The measured particle size distributions are shown in FIG. 1.

Example 1

According to the Invention

Composition: 61.5% $Al_2O_3$, 21% $CeO_2$, 15% $ZrO_2$, 2.5% $Y_2O_3$
(Corresponds to Comparative Example 1)

A metal salt solution consisting of 81.4 g of a solution of ammonium cerium(IV) nitrate ($CeO_2$ content=12.90%), 103.30 g of a solution of zirconyl nitrate ($ZrO_2$ content=7.26%) and 7.0 g of a solution of yttrium nitrate ($Y_2O_3$ content=17.80%) was used as the starting material which was heated to 90° C.

A suspension consisting of 615.0 g DISPERAL HP 14/7 (boehmite modified with citric acid) ($Al_2O_3$ content=5%) was prepared by stirring the solids into deionized water and then adding 24% ammonia solution up to a pH of 10. The suspension was added by drops slowly to the metal salt solution and after the addition was completed the pH was adjusted to 8.7 by adding 24% ammonia solution. This mixture was then stirred for 30 minutes at 90° C. Following that the mixture was filtered and the filter residue was washed with deionized water at 60° C. The filter cake was resuspended in deionized water while stirring and was then spray dried (inlet temperature=220° C., outlet temperature=110° C.). The dried material was calcined for four hours at 850° C.

Example 2

According to the Invention

Composition: 41% $Al_2O_3$, 30% $CeO_2$, 23% $ZrO_2$, 2.5% $Y_2O_3$, 3.5% $La_2O_3$
(Corresponds to Comparative Example 2)

A metal salt solution consisting of 96.9 g of a solution of ammonium cerium(IV) nitrate ($CeO_2$ content=12.90%), 131.96 g of a solution of zirconyl nitrate ($ZrO_2$ content=7.26%), 10.02 g of a solution of lanthanum nitrate ($La_2O_3$ content=14.57%) and 5.84 g of a solution of yttrium nitrate ($Y_2O_3$ content=17.80%) was used as the starting material which was heated to 90° C. A suspension consisting of 341.6 g DISPERAL HP 14/7 (boehmite modified with citric acid) ($Al_2O_3$ content=5%) was prepared by stirring the solids into deionized water and then adding 24% ammonia solution up to a pH of 10.

TABLE 1

Measured BET surface areas from Comparative Example 1 and Example 1 after calcining ($m^2/g$).

| | Comparative Example 1 (like EP 1 172 139) | Example 1 (acc. to invention) |
|---|---|---|
| 5 h/300° C. + 5 h/700° C. (starting material) | 168 | 126 |
| 5 h/950° C. | 109 | 95 |
| 4 h/1000° C. | 84 | 89 |
| 2 h/1100° C. | 32 | 70 |

The suspension was added by drops slowly to the metal salt solution and after the addition was completed the pH was adjusted to 8.5 by adding 24% ammonia solution. This mixture was then stirred for 30 minutes at 90° C. Following that the mixture was filtered and the filter residue was washed with deionized water at 60° C. The filter cake was resuspended in deionized water while stirring and was then spray dried (inlet temperature=220° C., outlet temperature=110° C.). The dried material was calcined for four hours at 850° C.

In FIG. 2 the x-ray powder diffractograms of the material from Example 2 after calcining are shown a) after calcining 4 h at 850° C.

b) after calcining 4 h at 850° C.+4 h at 1100° C.

c) after calcining 4 h at 850° C.+24 h at 1100° C.

d) simulated diffractogram of $CeO_2$ (cubic) e) simulated diffractogram of $CeO_2$ (tetragonal)

Example 3

According to the Invention

The Composition Corresponds Exactly to that from Comparative Example 2 41% $Al_2O_3$, 30% $CeO_2$, 23% $ZrO_2$, 2.5% $Y_2O_3$, 3.5% $La_2O_3$ 220.4 g of a suspension of Pural SB (boehmite, $Al_2O_3$ content=9.3%) (pH 9.5) was adjusted to a pH of 9.5 with a 24% ammonia solution and used as the starting material. At room temperature, a mixture consisting of 300 g of a solution of cerium acetate ($CeO_2$ content=5.0%), 50.3 g of a solution of zirconium acetate ($ZrO_2$ content=22.88%), 24.0 g of a solution of lanthanum acetate ($La_2O_3$ content=7.3%) and 31.3 g of a solution of yttrium acetate ($Y_2O_3$ content=4.0%) was added slowly at room temperature. The pH value was kept constant at 9.5 by adding a 24% ammonia solution at the same time. The resulting mixture was then stirred for 45 minutes. Next the suspension was autoclaved for three hours at 140° C. The resulting mixture was filtered and the solids were washed with deionized water at 60° C. This filter cake was dried for sixteen hours in a drying cabinet and then calcined at 850° C.

Example 4

According to the Invention

Composition: 41% $Al_2O_3$, 30% $CeO_2$, 23% $ZrO_2$, 2.5% $Y_2O_3$, 3.5% $La_2O_3$
(Corresponds to Comparative Example 2)

A boehmite suspension consisting of 492.0 g DISPERAL HP 14/7 (boehmite modified with citric acid) ($Al_2O_3$ content=5%) was prepared by stirring the solids into deionized water and then adding 24% ammonia solution up to a pH of 10.

At 90° C. a metal salt solution consisting of 139.53 g of a solution of ammonium cerium(IV) nitrate ($CeO_2$ content=12.90%), 190.1 g of a solution of zirconyl nitrate ($ZrO_2$ content 7.26%), 14.41 g of a solution of lanthanum nitrate ($La_2O_3$ content 14.57%) and 5.45 g of a solution of yttrium acetate ($Y_2O_3$ content 27.54%) was added slowly by drops to this suspension. The pH value was kept constant at 9.0 by adding a 24% ammonia solution at the same time. This mixture was then stirred for 30 minutes at 90° C. Following that the mixture was filtered and the filter residue was washed with deionized water at 60° C. The filter cake was resuspended in deionized water while stirring and then spray dried (inlet temperature=220° C., outlet temperature=110° C.). The dried material was calcined for four hours at 850° C.

Example 5

Composition: 41% $Al_2O_3$, 30% $CeO_2$, 23% $ZrO_2$, 2.5% $Y_2O_3$, 3.5% $La_2O_3$ Corresponds to Comparative Example 2 but Using by Cerium(III) Nitrate+$H_2O_2$ A metal salt solution consisting of 58.34 g of a solution of cerium(III) nitrate ($CeO_2$ content=18.00%), 131.96 g of a solution of zirconyl nitrate ($ZrO_2$ content=7.26%), 10.02 g of a solution of lanthanum nitrate ($La_2O_3$ content=14.57%) and 5.84 g of a solution of yttrium acetate ($Y_2O_3$ content 17.80%) was used as the starting material.

At room temperature 25.74 g of a 30% $H_2O_2$ solution cooled to 5° C. was added. The resulting suspension was stirred for 10 minutes and then heated to 90° C. A suspension consisting of 341.6 g DISPERAL HP 14/7 (boehmite modified with citric acid) ($Al_2O_3$ content 5%) was adjusted to a pH of 10 by stirring the solids into deionized water and then adding a 24% ammonia solution.

The suspension was added by drops slowly to the metal salt solution and after the addition was completed the pH was adjusted to 8.3 by adding 24% ammonia solution. This mixture was then stirred for 30 minutes at 90° C. Following that the mixture was filtered and the filter residue was washed with deionized water at 60° C. The filter cake was resuspended in deionized water while stirring and was then spray dried (inlet temperature=220° C., outlet temperature=110° C.). The dried material was calcined for four hours at 850° C.

TABLE 2

Measured surface areas (BET) from Examples 2-6 and Comparative Example 2 after calcining in $m^2/g$.

|  | Comparative Example 2, like EP 1 172 139 | Example 2 | Example 3 | Example 4 | Example 5 |
|---|---|---|---|---|---|
|  |  | According to the invention | | | |
| 4 h/850° C. (starting material) | 112 | 98 | 89 | 88 | 85 |
| 4 h/1100° C. | 18 | 49 | 34 | 46 | 51 |
| 24 h/1100° C. | 12 | 45 | 34 | 39 | 37 |
| 36 h/1150° C. |  | 20 |  |  | 25 |
| 4 h/1200° C. |  | 16 |  |  | 21 |

Example 6

According to the Invention

Composition: 51% $Al_2O_3$, 14.2% $CeO_2$, 34.8% $ZrO_2$
(Corresponds to Comparative Example 3)

A metal salt solution consisting of 55.0 g of a solution of ammonium cerium(IV) nitrate ($CeO_2$ content 12.90%) and 239.7 g of a solution of zirconyl nitrate ($ZrO_2$ content 7.26%) was used as the starting material and heated to 90° C.

A suspension consisting of 510.0 g DISPERAL HP 14/7 (boehmite modified with citric acid) ($Al_2O_3$ content 5%) was adjusted to a pH of 10 by stirring the solids into deionized water and then adding a 24% ammonia solution.

This suspension was added by drops slowly to the metal salt solution and after the addition was completed the pH was adjusted to 8.7 by adding 24% ammonia solution. This mixture was then stirred for 30 minutes at 90° C. Following that the mixture was filtered and the filter residue was washed with deionized water at 60° C. The filter cake was resuspended in deionized water while stirring and was then spray dried (inlet temperature=220° C., outlet temperature=110° C.). The dried material was calcined for four hours at 850° C.

The values from Comparative Example 3 are given in parentheses.

BET after 850° C./4 hours (starting material): 97 $m^2/g$ (107)

BET after 1100° C./2 hours: 62 $m^2/g$ (47)

BET after 1100° C./24 hours: 36 $m^2/g$ (35)

TABLE 3

Measured surface areas (BET) from Comparative Example 3 and Example 7 after calcining ($m^2/g$).

|  | Comparative Example 3 (like WO 2006/070201) | Example 6 (according to the invention) |
|---|---|---|
| 850° C./4 hours (starting material) | 107 | 97 |
| 2 h/1100° C. | 47 | 62 |
| 24 h/1100° C. | 35 | 36 |

Example 7

According to the Invention

Composition: 50% $Al_2O_3$, 30% $CeO_2$, 15% $ZrO_2$, 3.5% $La_2O_3$, 1.5% $Y_2O_3$
(Corresponds to Comparative Examples 4 and 5)

A metal salt solution consisting of 116.3 g of a solution of ammonium cerium(IV) nitrate ($CeO_2$ content=12.90%), 103.3 g of a solution of zirconyl nitrate ($ZrO_2$ content=7.26%), 12.1 g of a solution of lanthanum nitrate ($La_2O_3$ content=14.50%) and 4.2 g of a solution of yttrium acetate ($Y_2O_3$ content=17.80%) and heated to 90° C.

A suspension consisting of 500 g DISPERAL HP 14/7 (boehmite modified with citric acid) ($Al_2O_3$ content 5%) was adjusted to a pH of 10 by stirring the solids into deionized water and then adding a 24% ammonia solution.

This suspension was added by drops slowly to the metal salt solution and after the addition was completed the pH was adjusted to 8.3 by adding 24% ammonia solution. This mixture was then stirred for 30 minutes at 90° C. Following that the mixture was filtered and the filter residue was washed with deionized water at 60° C. The filter cake was dried for sixteen hours at 120° C. and then calcined for four hours at 850° C.

Example 8

According to the Invention

Composition: 50% $Al_2O_3$, 30% $CeO_2$, 15% $ZrO_2$, 3.5% $La_2O_3$, 1.5% $Y_2O_3$
(Corresponds to Comparative Examples 4 and 5)

A metal salt solution consisting of 116.3 g of a solution of ammonium cerium(IV) nitrate ($CeO_2$ content=12.90%), 103.3 g of a solution of zirconyl nitrate ($ZrO_2$ content=7.26%), 12.1 g of a solution of lanthanum nitrate ($La_2O_3$ content=14.50%) and 4.2 g of a solution of yttrium acetate ($Y_2O_3$ content=17.80%) and heated to 90° C.

A suspension consisting of 500 g DISPERAL HP 14/7 (boehmite modified with citric acid) ($Al_2O_3$ content=5%) was adjusted to a pH of 10 by stirring the solids into deionized water and then adding a 24% ammonia solution. This suspension was added by drops slowly to the metal salt solution and after the addition was completed the pH was adjusted to 9.0 by adding 24% ammonia solution. This mixture was then stirred for 30 minutes at 90° C. Following that the mixture was filtered and the filter residue was washed with deionized water at 60° C. The filter cake was resuspended in deionized water while stirring and was then spray dried (inlet temperature=220° C., outlet temperature=110° C.). The dried material was calcined for four hours at 850° C.

Example 9

According to the Invention

Composition: 70% $Al_2O_3$, 20% $CeO_2$, 7% $ZrO_2$, 3.0% $La_2O_3$

A boehmite suspension consisting of 420.0 g DISPERAL HP 14/7 (boehmite modified with citric acid) ($Al_2O_3$ content=5%) was adjusted to a pH of 10 by stirring the solids into deionized water and then adding a 24% ammonia solution. At 90° C. a metal salt solution consisting of 46.51 g of a solution of ammonium cerium(IV) nitrate ($CeO_2$ content=12.9%), 30.0 g of a solution of zirconyl nitrate ($ZrO_2$ content=7.0%) and 6.18 g of a solution of lanthanum nitrate ($La_2O_3$ content=14.57%) was added by drops slowly to this suspension. The pH was kept constant at 9.0 by adding a 24% ammonia solution at the same time. This mixture was then stirred for 30 minutes at 90° C. Following that the mixture was filtered and the filter residue was washed with deionized water at 60° C. The filter cake was resuspended in deionized water while stirring and then dried for sixteen hours at 120° C. The dried material was next calcined at 850° C.

TABLE 4

Measured surface areas (BET) from Comparative Examples 4 and 5 and Examples 8-10 in $m^2/g$.

| | Comparative Example 4 | Calculated* | Comparative Example 5 | Example 7 | Example 8 | Example 9 |
|---|---|---|---|---|---|---|
| 4 h/850° C. (starting material) | 130 | — | 96 | 92 | 96 | 101 |
| 4 h/1200° C. | 17 | 22 (5 h) | 23 | 23 | 25 | 40 |

*Surface areas calculated on the basis of the formulas given in WO2012/067654 A1

The invention claimed is:

1. A method for producing composites comprising aluminum oxide and mixed metal oxides of cerium and zirconium and comprising the steps of:
 (a) providing a suspension comprising boehmite as an alumina precursor, said suspension having a pH of from 6 to 11.5;
 (b) providing an aqueous metal salt solution comprising at least metal salts of cerium and zirconium;
 (c) bringing together the suspension of step (a) with the metal salt solution of step (b) at a temperature of from 5° C. to 95° C. or subjecting the slurry so obtained to a temperature of from 5° C. to 95° C.;
 (d) isolating solids from step (c); and
 (e) calcining the solids from step (d).

2. The method according to claim 1, wherein the isolating comprises separating an aqueous solution from the solids from step (c), washing the separated solids with water and drying the separated solids.

3. The method according to claim 1, wherein the isolating comprises the drying and (re)dispersing of the solids from step (c) in a liquid carrier and subsequently spray drying the solids.

4. The method according to claim 1, wherein the composites additionally comprise one or more members of the following group:
 alkaline earth elements/compounds, rare earth elements/compounds, zirconium compounds and silicon compounds, which are water soluble and which are added after step (c) or after step (d).

5. The method according to claim 1, comprising adding the alumina precursor suspension dropwise into the metal salt solution and then adjusting the pH to 6.5 to 11.

6. The method according to claim 1 comprising adding the alumina precursor suspension dropwise into said metal salt solution while at the same time adjusting the pH to 6.5 to 11.

7. The method according to claim 1 comprising adding the metal salt solution and an ammonia solution dropwise into the alumina precursor suspension to maintain a pH of 6.5 to 11.

8. The method according to claim 1, 5, 6, or 7 wherein the pH is from 8 to 10.5.

9. The method according to claim 1, 5, 6 or 7 wherein the pH is from 8.5 to 10.

10. The method according to claim 1, wherein the suspension of step (c) is hydrothermally aged in an aqueous environment.

11. The method according to claim 10, wherein the slurry obtained during or after step (c) is hydrothermally aged in an aqueous environment at a temperature of at least 90° C. and for at least one hour.

12. The method according to claim 10, wherein the slurry obtained during or after step (c) is hydrothermally aged in an aqueous environment at a temperature of at least 120° C. and for at least 4 hours.

13. The method according to claim 1 wherein the composites comprise in addition oxides of rare earth metals.

14. The method according to claim 1, wherein salts used to prepare said metal salt solution are water-soluble acetates, nitrates and/or chlorides.

15. The method according to claim 1 wherein said composites comprise a solid solution of Ce oxides, Zr oxides and said aluminum oxides, the Ce oxides, and Zr oxides are homogeneously distributed in said composites.

16. The method according to claim 1, wherein said composites comprise a solid solution of Ce oxides, Zr oxides and rare earth metal oxides and said aluminum oxides, the Ce oxides, Zr oxides and rare earth metal oxides are homogeneously distributed in said composites.

17. The method according to claim 1, wherein alkali and/or alkaline earth salts, other than barium salts, are excluded.

18. The method according to claim 1, wherein to the boehmites organic compounds are added having at least one carboxyl group (—COO and/or —COOH) and one or more other groups selected from hydroxy (—OH), oxo (—O), carboxy (—COO, —COOH) and/or amine (—NH and/or —$NH_2$).

19. The method according to claim 18, wherein the organic compounds comprise 2 to 12 carbon atoms and are added in an amount by weight of 0.1% to 50% based on the dry weight of the boehmite.

20. The method according to claim 1, wherein the pH of the suspension comprising boehmite is adjusted with a nitrogen containing base.

21. The method according to claim 20 wherein the nitrogen containing base is selected from one or more members of the group consisting of ammonia, urea and urotropine.

22. The method according to claim 1, wherein the composites comprising a mixed metal oxide comprise 20% to 80% by weight aluminum, 5% to 80% by weight zirconium, 5% to 80% by weight cerium calculated as $Al_2O_3$, $ZrO_2$, and $CeO_2$, respectively.

23. The method according to claim 1, wherein the composites comprising a mixed metal oxide comprise 20% to 80% by weight aluminum, 5% to 80% by weight zirconium, 5% to 80% by weight cerium and 0 to 12% by weight rare earth metals (RE), calculated as $Al_2O_3$, $ZrO_2$, $CeO_2$, and $Re_2O_3$, respectively.

24. The method according to claim 1, wherein the boehmite or the suspension comprising boehmite is prepared by hydrolysis of an aluminum alkoxide.

* * * * *